United States Patent [19]

Rivera

[11] Patent Number: 5,077,896
[45] Date of Patent: Jan. 7, 1992

[54] ADAPTER FOR CONVERTING A CIRCULAR SAW TO A BEAM CUTTING CHAIN SAW

[76] Inventor: Jess R. Rivera, 5947 Jadeite Ave., Altaloma, Calif. 91701

[21] Appl. No.: 745,943

[22] Filed: Aug. 16, 1991

[51] Int. Cl.$^5$ .............................................. B27B 17/00
[52] U.S. Cl. ......................................... 30/122; 30/381; 30/500
[58] Field of Search ................. 30/122, 381, 382, 383, 30/386, 500; 83/574

[56] References Cited

U.S. PATENT DOCUMENTS

| | | | |
|---|---|---|---|
| 2,839,097 | 6/1958 | Siria | 30/122 |
| 2,860,671 | 11/1958 | Wilder | 30/500 |
| 2,879,814 | 3/1959 | Scott | 30/122 |
| 3,007,499 | 11/1961 | Dobslaw | 83/574 |
| 3,267,973 | 8/1966 | Beard | 30/386 |
| 4,033,035 | 7/1977 | Trimmer | 30/500 |
| 4,121,336 | 10/1978 | Loyd | 30/122 |
| 4,160,319 | 7/1979 | Caruso | 30/122 |
| 4,270,370 | 6/1981 | Loyd | 30/122 |
| 4,272,889 | 6/1981 | Scott et al | 30/122 |
| 4,566,511 | 1/1986 | Robinson | 30/122 |
| 4,615,117 | 10/1986 | Flath | 83/574 |
| 4,649,644 | 3/1987 | Huddleston | 30/122 |
| 4,765,098 | 8/1988 | Duff et al. | 83/574 |
| 4,821,415 | 4/1989 | Kress | 30/122 |
| 4,858,318 | 8/1989 | Anderson | 30/122 |
| 4,945,637 | 8/1990 | Anderson | 30/122 |

Primary Examiner—Frank T. Yost
Assistant Examiner—Hwei-Siu Payer
Attorney, Agent, or Firm—Hawes & Fischer

[57] ABSTRACT

An adapter for quickly and easily converting a portable, 7¼ inch wormdrive circular saw into a beam cutting chain saw, whereby to increase the cutting capacity of the saw from about 2¼ inches to about 12 inches. the adapter carries a standard cutting chain and includes a hinged attached assembly to be removably connected to the existing slide bars of the saw. The attachment assembly comprises a pivotal hinge and a hinge attachment plate. The hinge and/or the adjustment plate may be pivoted relative to one another to vary the effective length of the hinged attachment assembly and thereby facilitate the connection of the adapter to the slide bars of the saw. By adjusting the length of the hinged attachment assembly, the adapter can be selectively sized for use with virtually all commercially available power saws, regardless of the radial distance between the existing motor shaft and the slide bars of the saw. The adapter also includes an efficient carrier assembly that permits the adapter to be quickly and easily coupled to the motor shaft so that the cutting chain of the adapter may be driven thereby.

20 Claims, 6 Drawing Sheets

ADAPTER FOR CONVERTING A CIRCULAR SAW TO A BEAM CUTTING CHAIN SAW

BACKGROUND OF THE INVENTION

1. Field of the Invention

This invention relates to an improved adapter by which to convert virtually any commercially available wormdrive circular saw into a chain saw having an increased cutting capacity which is characteristic of such a chain saw.

2. Background Art

Adapters and attachments are known by which to convert a circular saw to a chain saw. However, a disadvantage that is common to many conventional adapters is that parts (e.g. the safety guard) must first be removed from the saw before the adapter can be attached. Not only is the process of removing parts from the saw time consuming, but some parts, particularly nuts, bolts, and the like, may often become lost or misplaced. Moreover, once the adapter is attached to the saw, the user may be required to attach the cutting chain which can prove to be another difficult and time consuming task. What is more, when converting the chain saw back to a circular saw, the user may encounter difficulty in either removing the adapter or returning those parts that were previously removed from the saw when the adapter was first attached. Likewise, some conventional adapters are not compatible with all commercially available saws, thereby necessitating more than one adapter for saws of different size or manufacturer.

Examples of conventional adapters for converting a circular saw to a chain saw are available by referring to one or more of the following U.S. Pat. Nos.:

4,121,336 24 Oct. 1978
4,160,319 10 July 1979
4,272,889 16 June 1981
4,649,644 17 March 1987
4,821,415 18 April 1989
4,858,318 22 Aug. 1989
4,945,637 7 Aug. 1990

However, none of the patents listed above shows or discloses a universal adapter that is detachably connected at the existing motor shaft and slide bars of a power saw, and wherein the adapter has means by which to facilitate its connection at the shaft and slide bars of virtually any saw, regardless of the distance therebetween.

SUMMARY OF THE INVENTION

In general terms, a compact, east to install adapter is disclosed for converting a portable 7¼ inch wormdrive circular saw into a beam cutting chain saw. By virtue of the foregoing, the cutting capacity of the saw may be increased from about 2¼ inches to about 12 inches. The adapter includes a standard chain bar and cutting chain and is connected to the saw as a single, preassembled unit, so that no further assembly is required on the part of the user. The adapter is removably attached to the saw at two points by a carrier assembly that is coupled to the existing motor shaft of the saw and a hinged attachment assembly that is connected to the existing slide bars of the saw.

The hinged attachment assembly includes a hinge adjustment end plate and a hinge. The hinge adjustment end plate is bolted to the slide bars, and the hinge is pivotally connected to the adjustment plate. Prior to the connection of the hinged attachment assembly to the slide bars of the saw, the hinge and/or the hinge adjustment end plate are pivoted relative to one another to vary the effective length of the assembly and thereby facilitate the fit of the adapter to the saw. More particularly, the size or radial distance of the adapter between the carrier assembly and the hinged attachment assembly thereof can be selectively adjusted to correspond with the radial distance between the motor shaft and the slide bars of the particular saw. In this manner, the adapter can be quickly and easily made to fit virtually any conventional power saw without making modifications to or removing safety features from the saw.

The carrier assembly, by which the adapter is coupled to the motor shaft, includes a spacer bushing to surround the shaft and a hollow gear adapter to which the rotation of the shaft is imparted for correspondingly rotating a drive chain gear. The drive chain gear surrounds the gear adapter and is coupled to the cutting chain, such that a rotation of the drive chain gear causes a rotation of the chain. A left-handed bolt is rotated into engagement with the shaft by way of the gear adapter so that the rotation of the motor shaft is transferred to the gear adapter for rotating the cutting chain. In the assembled relationship of the carrier assembly, the bolt is coaxially aligned relative to the gear adapter and the motor shaft, and an annular ball bearing surrounds the gear adapter to preserve the desired alignment.

DETAILED DESCRIPTION OF THE INVENTION

Figure 1:
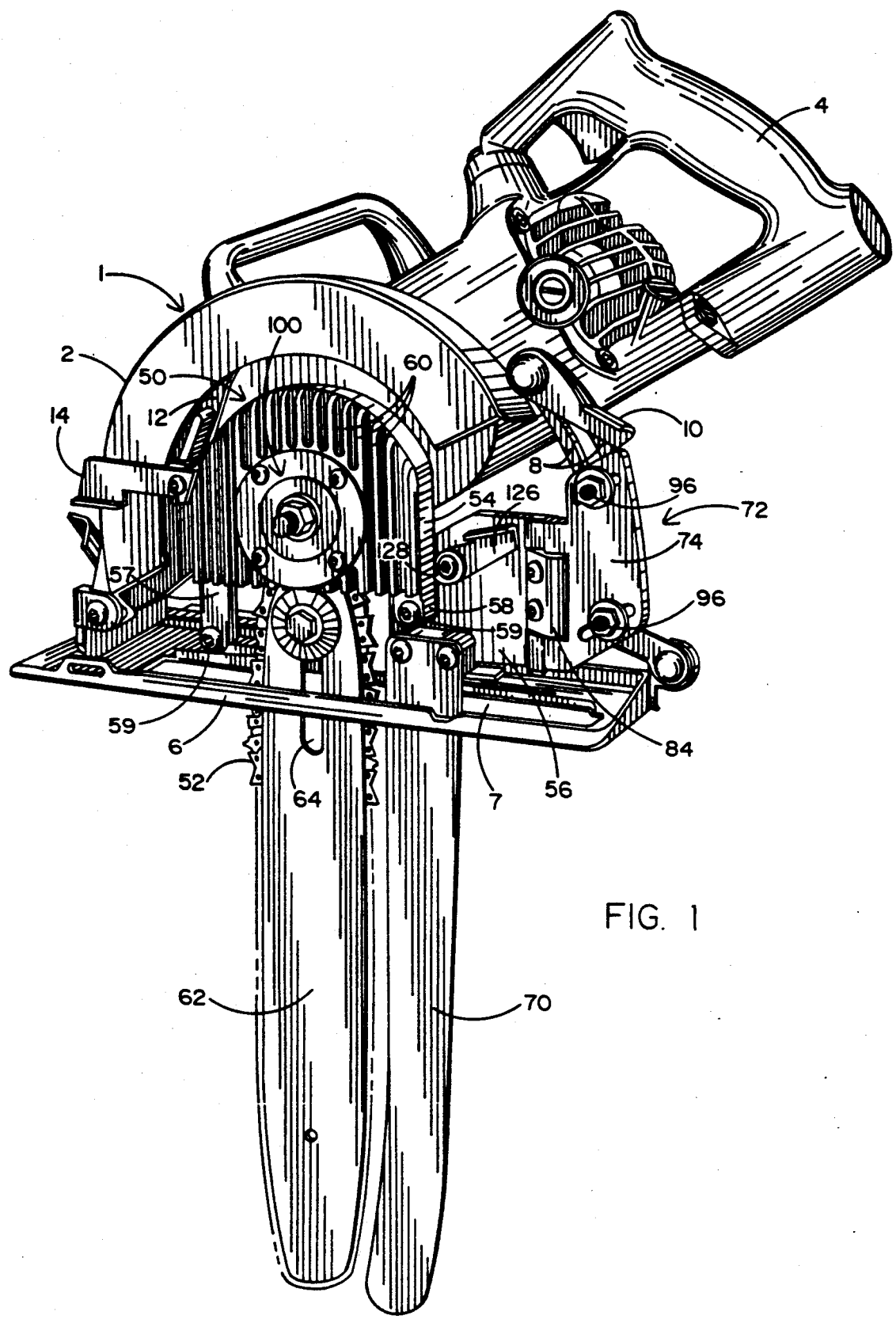
FIG. 1 shows the adapter of the present invention releaseably attached to a conventional power saw to convert said saw from a circular saw to a beam cutting chain saw.
Figure 2:
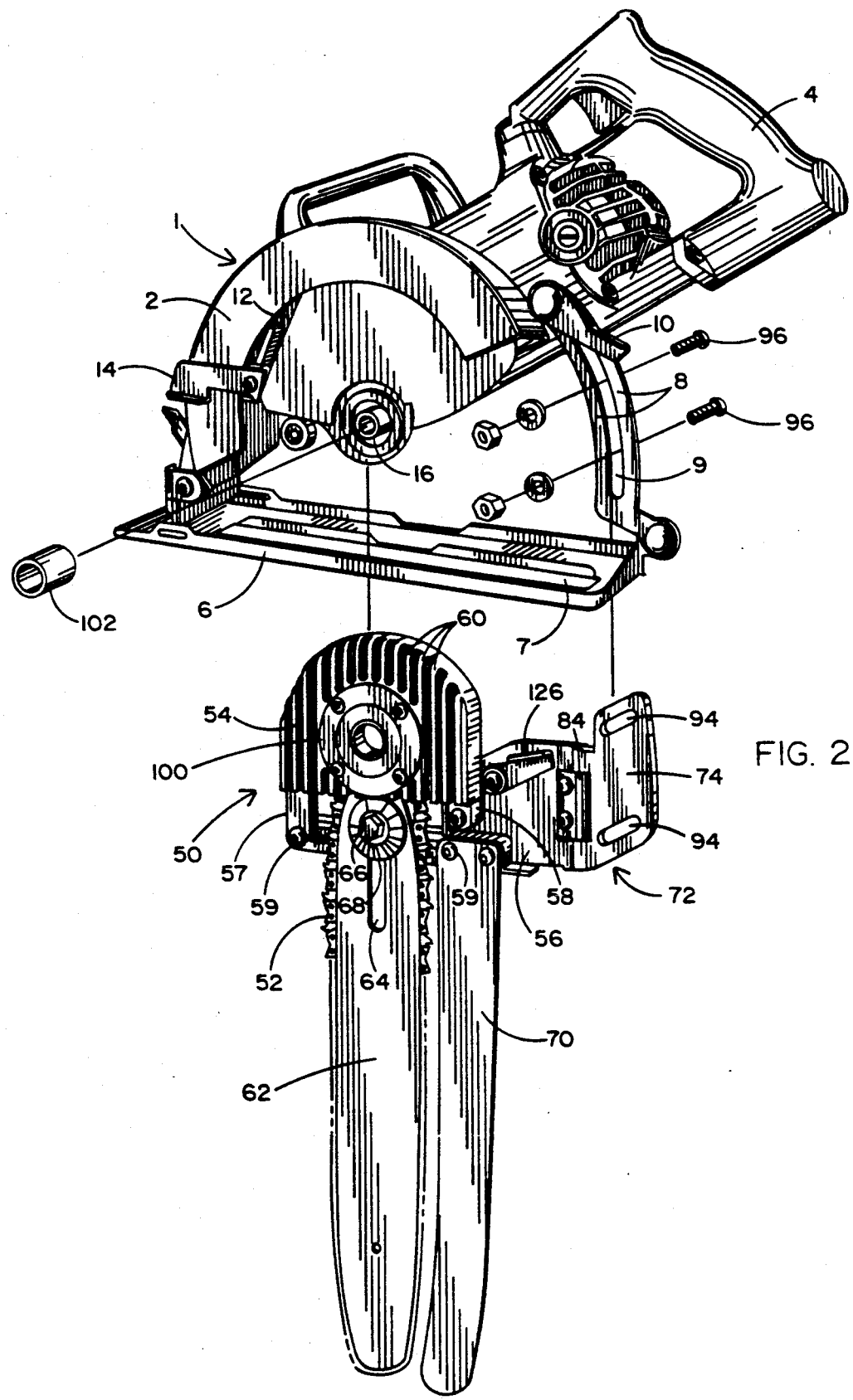
FIG. 2 shows the adapter of FIG. 1 detached from the power saw of FIG. 1.

The adapter 50 for easily and quickly converting a portable 7¼ inch wormdrive circular saw to a beam cutting chain saw is initially described while referring concurrently to FIGS. 1 and 2 of the drawings, where there is shown a conventional power saw 1 having the circular saw blade removed therefrom and a cutting chain 52 attached thereto. Being that power saw 1 is of conventional design, it will not be described in detail. Briefly, however, power saw 1 includes the usual housing 2, handle 4, horizontally extending support shoe or foot plate 6, slide bars 8, cutting angle adjustment lever 10, rotatable safety guard 12 and associated safety guard lever 14.

Details regarding the adapter 50 which forms the present invention are now described while referring particularly to FIG. 2. The adapter 50 includes a bearing housing 54 which lies above and is fixedly attached to a mainframe 56. That is, a pair of arms 57 and 58 are integrally connected to and extend from bearing housing 54. Suitable attachment means (e.g. button head screws 59) are received through axially aligned, screw threaded holes (not shown) formed in the arms 57 and 58 and the mainframe 56, therebelow, to attach the bearing housing 54 to the mainframe 56. However, in the assembled relationship (of FIG. 1) bearing housing 54 is spaced above mainframe 56 by the thickness of the arms 57 and 58. Each of the bearing housing 54 and mainframe 56 is manufactured from a lightweight metallic material, preferably aluminum, or the like. In order to dissipate the heat transferred thereto, a series of parallel aligned cooling fins 60 are formed in mainframe 56.

A first end of a chain bar 62 is adjustably attached to the mainframe 56 of adapter 50. An elongated adjustment slot 64 is established through the first end of chain bar 62, and a threaded lockdown bolt 66 is positioned through slot 64 for receipt within a correspondingly threaded hole (not shown) in the mainframe 56. A suitable washer 68 is located between the head of lockdown bolt 66 and the chain bar 62, as is the usual practice. The first end of chain bar 62 is slidable vertically relative to a soon-to-be-described carrier assembly 100 of adapter 50 to vary the tension in the cutting chain 52. More particularly, the chain bar 62 may be moved closer to or further from carrier assembly 100 by loosening lockdown bolt 66 and sliding said chain bar through the space between bearing housing 54 and the mainframe 56. Once the desired tension on cutting chain 52 is achieved, the lockdown bolt 66 is tightened against chain bar 62 to prevent the further displacement thereof. The configuration of elongated slot 64 permits the vertical position of chain bar 62 to be easily adjusted and aligned for receipt of lockdown bolt 66 therethrough. By virtue of the foregoing, the chain bar 62 is affixed to and projects vertically from the mainframe 56 through the window 7 in the horizontally extending support shoe 6 through which a circular blade would normally be positioned if saw 1 were to be used as a circular saw.

The cutting chain 52 is of a well known type and has a plurality of cutting links or teeth. Cutting chain 52 is driven around the chain bar by coupling the carrier assembly 100 to the motor shaft 16 in a manner to be hereinafter described. The adapter 50 enables the cutting capacity of a standard circular saw to be increased from about 2¼ inches to about 12 inches for use as a beam cutting chain saw, although these dimensions are not to be regarded as a limitation of the present invention.

Aligned parallel with the chain bar 62 is a conventional safety guard 70 (also known as a kick-back guard or guide bar). One end of safety guard 70 is fixedly attached to the mainframe 56 of adapter 50 by means of suitable fasteners (e.g. button screws) extending through respective screw threaded holes (not shown) formed therein. Safety guard 70 projects vertically from mainframe 56 and extends through the cutting window 7 of support shoe 6 to help prevent injury to the user due to either accidental contact with the cutting chain 52 or wood chips flying off said chain.

As an important detail of the present invention, the adapter 50 herein disclosed is provided with a hinged attachment assembly 72, by which adapter 50 can be quickly and easily attached to the housing of virtually any conventional circular saw. More particularly, and referring to FIG. 3 of the drawings, the attachment assembly 72 includes a hinge adjustment end plate 74 having a pair of ears 75 and 76 integrally formed with and projecting horizontally and in spaced parallel alignment from one side thereof. A vertical hole is formed through each ear 75 and 76, and at least one of said holes 78 is threaded.

The mainframe 56 of adapter 50 is provided with a hinge receiving end having a pair of ears 79 and 80 integrally formed with and projecting horizontally and in spaced parallel alignment therefrom. The hinge end plate 74 and hinge receiving end of mainframe 56 are disposed, such that the ears 75 and 79 thereof are arranged in spaced, opposing alignment with one another, and the ears 76 and 80 are also arranged in spaced, opposing alignment with one another. A vertical hole is formed through each ear 79 and 80 of mainframe 56, and at least one of said holes 82 is threaded.

Figure 4:
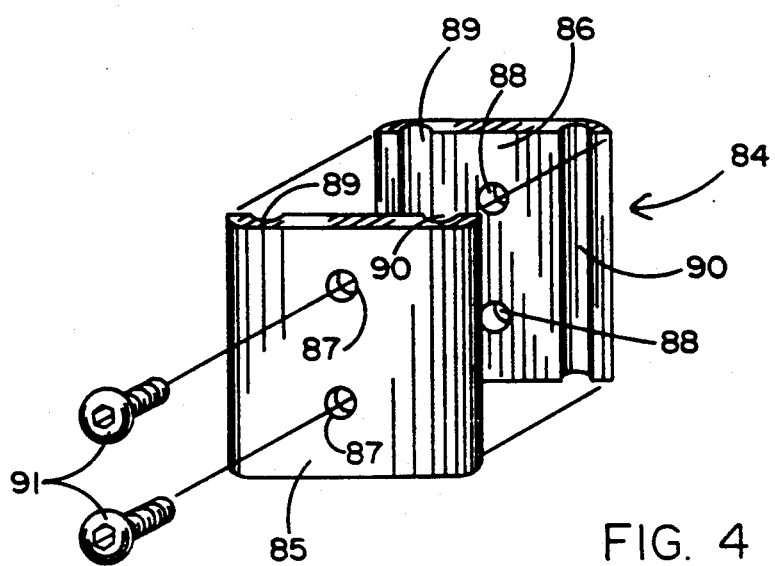
FIG. 4 is an exploded view of a hinge which forms the hinged attachment assembly of FIG. 3.

Located between the hinge adjustment end plate 74 and the hinge receiving end of mainframe 56 is a hinge 84. The hinge 84 may be either a single, plate-like member, or, as shown in FIG. 4 of the drawings, hinge 84 may comprise top and bottom halves 85 and 86. Each of the top and bottom halves 85 and 86 of hinge 84 has a pair of axially aligned and threaded screw holes 87 and 88 formed therethrough. Each of the top and bottom halves 85 and 86 also has a pair of spaced, parallel aligned channels 89 and 90 running vertically therealong. In the assembled relationship, respective fasteners (e.g. button head screws 91) are located through the screw holes 87 and 88 of the top and bottom halves 85 and 86 of hinge 84 to fasten such halves together. With the halves 85 and 86 of hinge 84 fastened together, the respective channels 89 and 90 thereof oppose one another to complete cylindrical bolt holes (best shown in FIG. 5).

Figure 3:
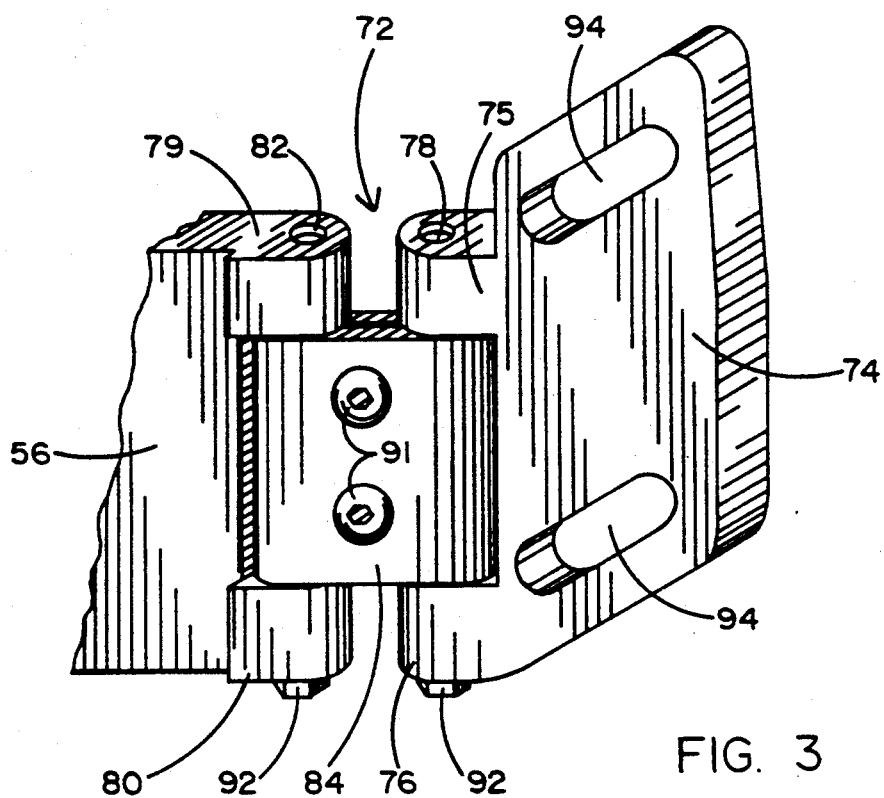
FIG. 3 shows an enlarged detail of a hinged attachment assembly by which the adapter of FIGS. 1 and 2 is attached to the existing slide bars of the power saw.
Figure 5:
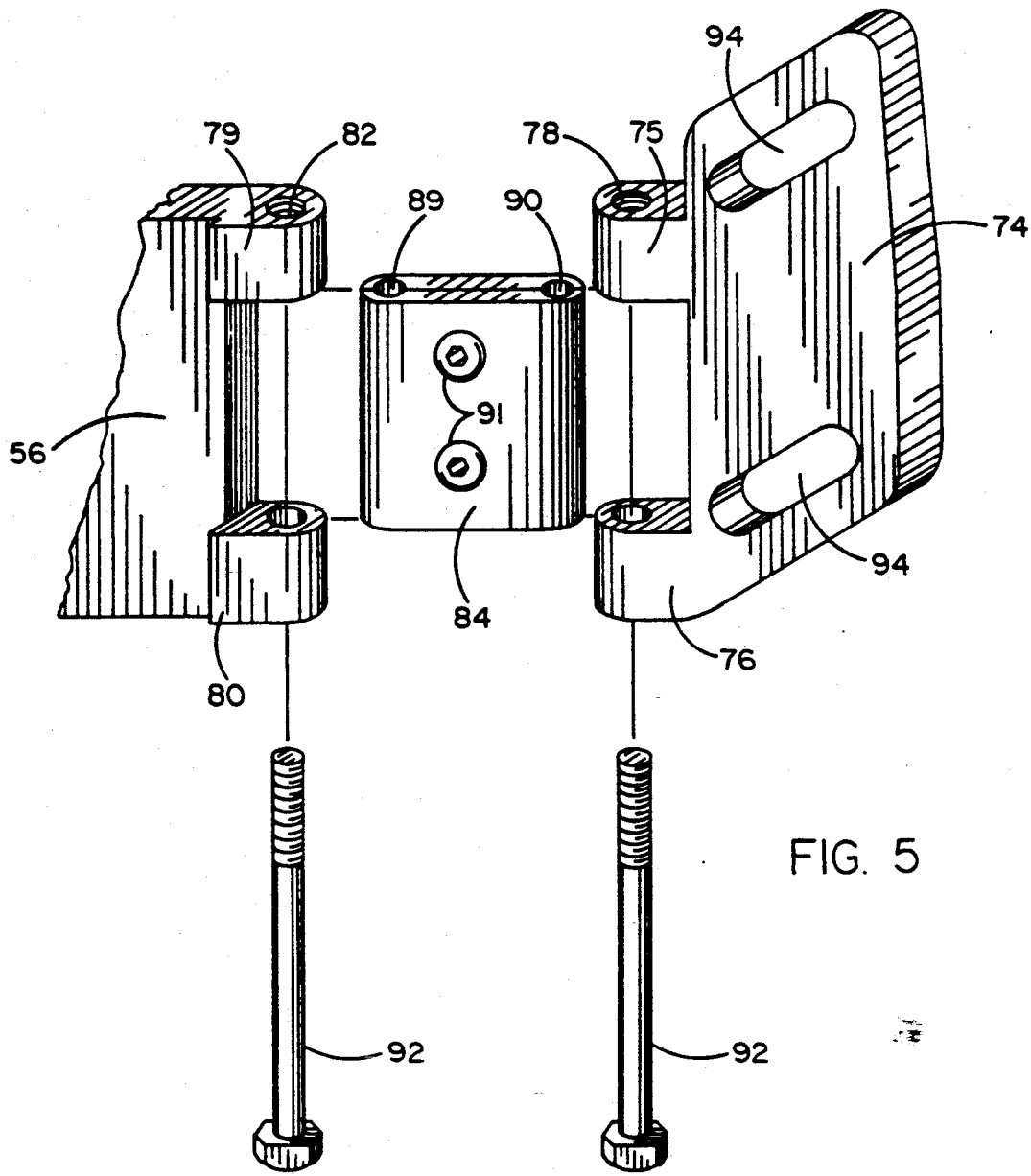
FIG. 5 is an exploded view of the hinged attachment assembly of FIG. 3.
Figure 6:
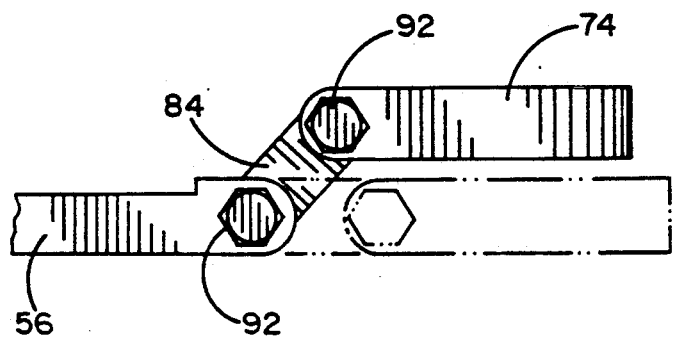
FIG. 6 illustrates the pivotal nature of the hinged attachment assembly of FIG. 3.

Referring concurrently now to FIGS. 3 and 5 of the drawings, the hinge 84 is shown pivotally assembled within the adapter 50 between the hinge receiving end of the mainframe 56 and the hinge adjustment end plate 74. In the assembled configuration (best shown in FIG. 3) one side of the hinge 84 is located in the space between the ears 79 and 80 of the mainframe 56, such that the bolt hole 89 formed through said hinge 84 is positioned between and in axial alignment with the holes (e.g. 82) through the respective ears 79 and 80. The opposite side of hinge 84 is located in the space between the ears 75 and 76 of the hinge adjustment end plate 74, such that the bolt hole 90 formed through said hinge 84 is positioned between and in axial alignment with the holes (e.g. 78) through respective ears 75 and 76. Accordingly, conventional threaded hinge bolts 92 can be inserted through the respective axial alignments of bolt hole 89 and threaded ear hole 82, as well as bolt hole 90 and threaded ear hole 78. By virtue of the foregoing, and as is represented by the phantom lines in FIG. 6 of the drawings, both the hinge adjustment end plate 74 and the hinge 84 are pivotable independently relative to one another and to the hinge receiving end of mainframe 56 around the hinge bolts 92.

The advantage of the foregoing pivotal interconnection of hinge adjustment end plate 74 to hinge 84 and hinge 84 to mainframe 56 will now be disclosed while referring concurrently to FIGS. 1-3. As is best shown in FIG. 3, the end plate 74 is provided with a pair of elongated bolt holes 94, although the precise number of such bolt holes is not to be regarded as a limitation of the present invention. To removably attach the adapter 50 to the power saw 1 as shown in FIG. 1, the hinge adjustment end plate 74 of hinged attachment assembly 72 is positioned flush against the slide bars 8 of saw 1, such that the chain bar 62 extends through the window 7 in support shoe 6 in perpendicular alignment to the ground, and the bolt holes 94 of end plate 74 are aligned with the space (designated 9 in FIG. 2) between the slide bars 8. A pair of carriage bolts 96 are then inserted through the space 9 between slide bars 8 and the bolt holes 94 of hinge adjustment end plate 74 to attach plate 74 to bars 8. Of course, a nut and washer combination (like that of FIG. 2) may be tightened to each carriage bolt 96 to prevent the inadvertent removal of said bolt from its hole 94 and thereby preserve the cutting angle of chain bar 62.

Because the hinge adjustment end plate 74 and hinge 84 are adapted to pivot, the hinged attachment assembly 72 of adapter 50 is universally adapted to be connected to the slide bars 8 of substantially all commercially available power saws. That is to say, some power saws differ from one another in the radial distance between the existing motor shaft and the slide bars 8 thereof. By pivoting hinge adjustment end plate 74 and/or hinge 84 around hinge bolts 92, the distance between the hinge receiving end 56 of attachment assembly 72 and the hinge adjustment end plate 74 may be selectively varied to correspond with the aforementioned radial dimension of the particular saw and permit the elongated bolt holes 94 through end plate 74 to be quickly and easily aligned with the space 9 between slide bars 8 so as to receive carriage bolts 96. The ability to adjust the length of hinged attachment assembly 72 to fit virtually any power saw overcomes the need, expense and inconvenience that would be associated with having to provide a separate adapter or conversion unit for power saws of different size and/or manufacturer.

Figure 7:
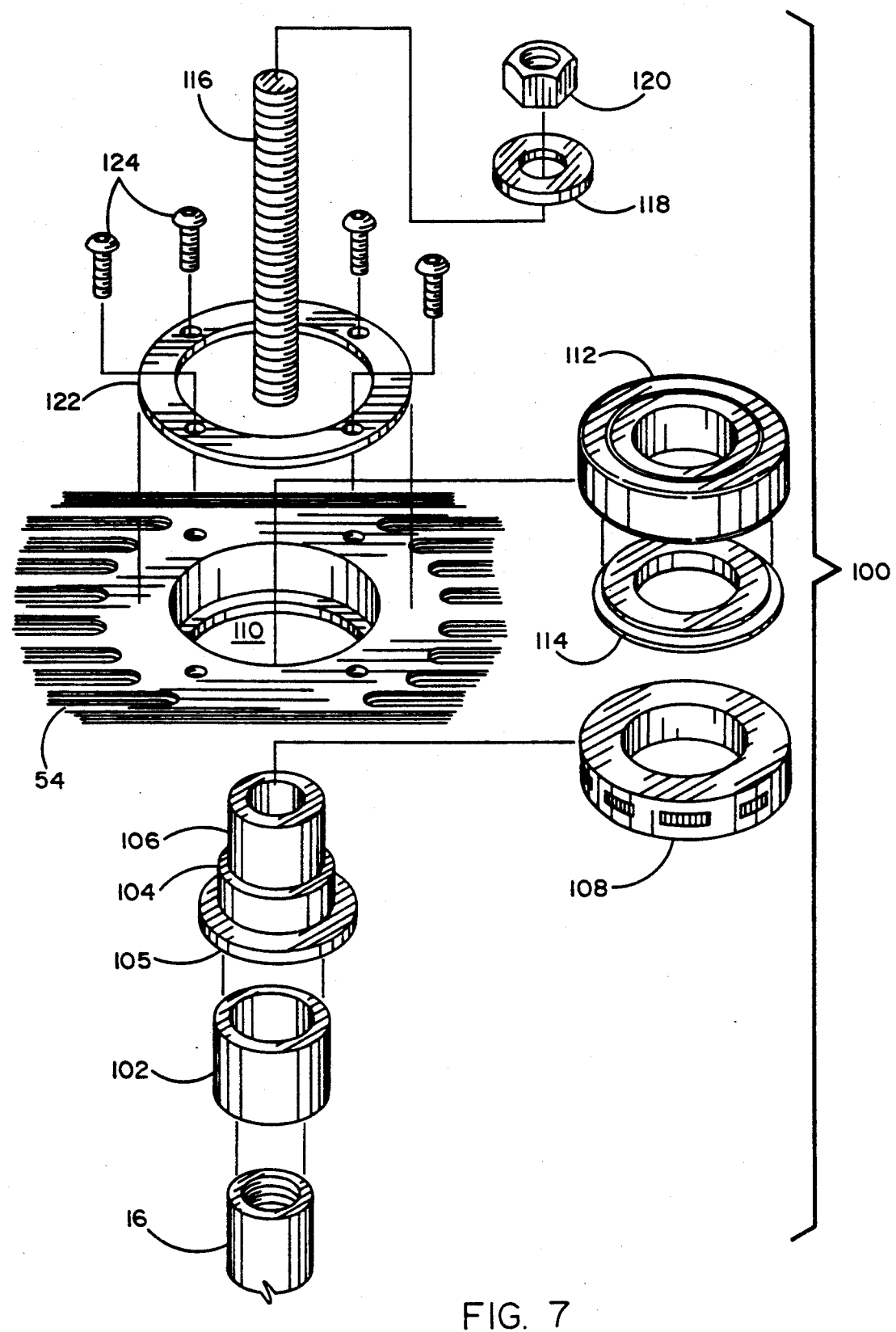
FIG. 7 is an exploded view of a carrier assembly by which the adapter of FIGS. 1 and 2 is coupled to the existing motor shaft of the saw.
Figure 8:
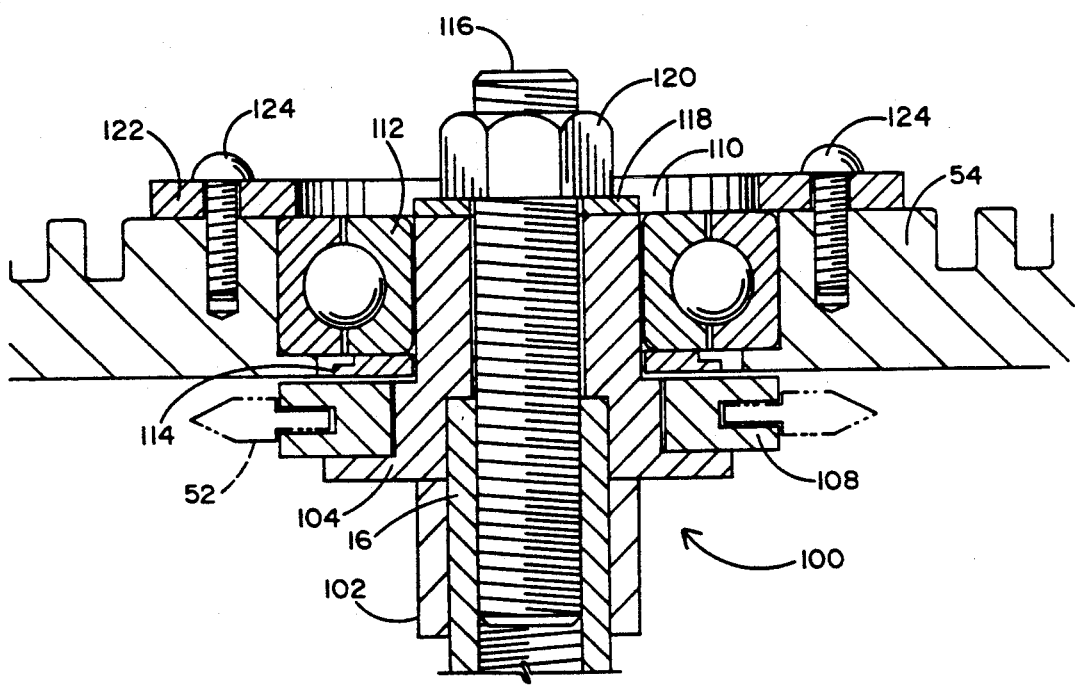
FIG. 8 is a cross-section showing the carrier assembly of FIG. 7 in the assembled relationship.

The carrier assembly 100, which enables adapter 50 to be easily and reliably coupled to the motor shaft of a conventional power saw, is now described while referring concurrently to FIGS. 7 and 8 of the drawings. Carrier assembly 100 includes a hollow, cylindrical spacer bushing 102 having a diameter to permit said bushing to be inserted onto and surround the existing motor shaft 16 of the saw. A hollow gear adapter 104 has an annular receptacle formed around the bottom thereof in which to receive the motor shaft 16 (best shown in FIG. 8), whereby to mate the carrier assembly 100 to the shaft 16. Gear adapter 104 is provided with a radially extending flange 105 which surrounds the aforementioned receptacle and upon which a drive chain gear 108 is supported. Drive chain gear 108 is of conventional design and is engaged in surrounding relationship by the cutting chain 52 of adapter 50 in the usual fashion (also best shown in FIG. 8), such that the rotation of gear 108 causes a corresponding rotation of the chain 52 to produce the cutting action of the chain saw.

A round opening 110 is formed through bearing housing 54 through which a neck 106 of the gear adapter 104 is received. In the assembled configuration of FIG. 8, the drive chain gear 108 and the cutting chain 52 are disposed below bearing housing 54. In this manner, and as previously described, the portion of the chain 52 which engages drive chain gear 108 is located in the space between the housing 54 and the mainframe 56 of adapter 50 (best illustrated in FIG. 1). Thus, the interface of cutting chain 52 to drive chain gear 108 will be shielded to improve stability and minimize the impact of dust and other airborne particles.

An annular ball-type bearing 112 of convention design surrounds the neck 106 of gear adapter 104 at the opening 110 through bearing housing 54. Ball bearing 112 provides support to and preserves the alignment of the carrier assembly 100, particularly when carrier assembly 100 is rotated by the motor shaft 16. A spacer ring 114 surrounds the neck 106 of gear adapter 104 to separate bearing 112 from gear adapter 104.

One end of a left-handed, all-thread bolt 116 is fastened to the motor shaft 16 (best shown in FIG. 8) through the hole 110 in bearing housing 54 by way of the gear adapter 104. A combination washer 118 and left-handed spindle nut 120 are mated to the opposite end of bolt 116 and then tightened down against gear adapter 104 to preserve a coaxial alignment of bolt 116 relative to adapter 104 and motor shaft 16. The carrier assembly 100 is completed by securing a retainer ring 122 to bearing housing 54 to extend around the opening 110 thereof and prevent the inadvertent detachment or misalignment of the components which form assembly 100. Retainer ring 122 is secured to bearing housing 54 by a suitable plurality of screws 124, or the like, which extend through axially aligned screw holes in ring 122 and the housing 54 therebelow.

It may now be appreciated while referring to FIG. 8 that with spindle nut 120 fastened to bolt 116 and tightened down against gear adapter 104 and with retainer ring 122 secured to bearing housing 54, the carrier assembly 100 functions to efficiently transfer the rotation of the motor shaft 16 to the cutting chain 52 to drive the chain around the chain bar (designated 62 in FIG. 2) and thereby convert the circular saw to a beam cutting chain saw. More particularly, the rotation of motor shaft 16 rotates bolt 116 which, in turn, rotates the gear adapter 104, by virtue of spindle nut 120 being tightened thereagainst. This rotation of gear adapter 104 rotates the chain drive gear 108 to thereby cause cutting chain 52 to rotate.

Details are now provided of the method for quickly and easily attaching the adapter 50 of this invention to the power saw 1 of FIGS. 1 and 2 so as to convert said saw from a conventional circular saw having a 2¼ inch cutting capacity to a beam cutting chain saw having a 12 inch cutting capacity. The circular saw 1 is initially conditioned to receive the adapter 50 by merely removing from said saw the spindle nut, the circular blade which is held by said spindle nut, and the blade adapter (i.e. also known as the diamond bushing). The adapter 50 is installed by first inserting the spacer bushing 102 (of FIGS. 7 and 8) around the motor shaft 16. It has been found that a spacer bushing 102 having a length of either 0.786 inches or 0.686 inches is required, depending upon the dimensions and manufacturer of the saw. The safety guard lever 14 is now operated to rotate safety guard 12 in a counterclockwise direction.

Next, the adapter 50 is attached, as a single unit, to the saw, such that the chain bar 62 extends through the window 7 of support shoe 6 and the motor shaft 16 is received by the gear adapter 104 of carrier assembly 100 (of FIGS. 8 and 9). The adapter 50 is affixed to the saw by inserting one end of the threaded bolt 116 through gear adapter 104 and rotating said bolt into engagement with shaft 16. Spindle nut 120 is then tightened around the opposite end of bolt 116. Lastly, carriage bolts 96 are inserted through the space 9 between slide bars 8 and the bolt holes 94 of the hinge adjustment end plate 74 of hinged attachment assembly 72. However, as previously described, the hinge 84 and/or the hinge adjustment end plate 74 may first be pivoted relative to one another to vary the effective length of the hinged attachment assembly 72 to facilitate the fit of adapter 50 to the particular saw. That is, the size or length of adapter 50 between its points of attachment at the existing motor shaft 16 and the slide bars 8 of saw 1 can be selectively adjusted depending upon the corresponding dimension of the saw. Fasteners are then mated to the carriage bolts 96 to prevent the movement of hinge adjustment end plate 74 relative to slide bars 8. Once attached, the adapter 50 may be easily removed from the saw 1 by reversing the steps just described.

As will be appreciated by those skilled in the art, it may be desirable to finally adjust the tightness of the cutting chain 52 around the chain bar 62 after adapter 50 has been attached to saw 1. As an additional advantage of the adapter 50, a tension adjust lever 126 (best shown in FIGS. 1 and 2) is provided to vary the tension of chain 52. Tension adjust lever 126 is pivotally attached to the mainframe 56 of adapter 50 by means of a cam wheel having a step 128 which projects therefrom and contacts the bearing housing 54. After loosening the screw 59 through the arm 58 of bearing housing 54, a rotation of lever 126 in a clockwise direction will cause a corresponding rotation of the step 128 of said lever 126 against bearing housing 54 to cause said housing 54 to rotate in a counter-clockwise direction around the screw 59 through the arm 57 of housing 54. However, it may also be necessary to first loosen screw 59 from its arm 57. Inasmuch as the position of chain bar 62 is fixed relative to that of bearing housing 54, a rotation of said housing 54 around screw 59 will cause a corresponding tightening of the cutting chain 52 by virtue of the drive chain gear 108 (of FIGS. 7 and 8) being interconnected and movable with housing 54.

By virtue of the present invention, an adapter 50 is available to be attached to a conventional power saw 1 as a single, preassembled unit, such that no further assembly is required on the part of the user. Thus, there is no need to install the chain 52 after adapter 50 has been attached to the saw. Moreover, no safety features (e.g. the safety guard) must first be removed from the saw before the adapter 50 can be attached. Accordingly, the adapter 50 of the present invention may be installed in a few minutes, as opposed to 10-30 minutes often required to install some conventional adapters. Likewise, the adapter 50 may be quickly and easily removed from the saw so as not to be regarded as a fixture, where one would be discouraged from removing the adapter once it was attached. What is still more, by virtue of the ability to vary the size of the adapter 50 between its point of attachment to the motor shaft 16 and its point of attachment to the slide bars 8 of the saw, said adapter may be selectively adjusted to fit virtually any commercially available power saw.

It will be apparent that while a preferred embodiment of the invention has been shown and described, various modifications and changes may be made without departing from the true spirit and scope of the invention. For example, although reference has been made to the power saw 1 as a wormdrive saw, this is not to be regarded as a limitation of the applicability and usefulness of adapter 50. Thus, adapter 50 may be advantageously used with virtually any conventional power saw, regardless of the particular drive thereof.

I claim:

1. An adapter to be attached to a circular saw after the circular blade has been removed therefrom to convert said saw to a chain saw, said saw being of the type having a motor, a shaft rotated by said motor, and a pair of slide bars spaced radially outward from said shaft, said adapter comprising:

first attachment means by which to couple said adapter to the motor shaft of the saw;

second attachment means by which to connect said adapter to the slide bars of the saw, said first and second attachment means being distanced from one another; and means by which to vary the distance between the first and second attachment means of said adapter to correspond with the radial distance of the saw between the motor shaft and the slide bars thereof to facilitate the attachment of said adapter to said saw.

2. The adapter recited in claim 1, wherein said means to vary the distance between said first and second attachment means includes hinge means pivotally connected between said first and second attachment means.

3. The adapter recited in claim 1, wherein said first attachment means includes a housing to be coupled to the motor shaft of the saw and said second attachment means includes an end plate to be attached to the slide bars of the saw, said means to vary the distance between said first and second attachment means including a hinge pivotally interconnected between said housing and said end plate.

4. The adapter recited in claim 3, wherein said hinge includes first and second ends, said first end of said hinge pivotally attached to said housing, and the second end of said hinge pivotally attached to said end plate, such that said hinge and said end plate are rotatable independently of one another.

5. The adapter recited in claim 4, further comprising a first bolt to pivotally interconnect said first end of said hinge to said housing so that said hinge is rotatable around said first bolt relative to said housing, and a second bolt to pivotally interconnect said end plate to said second end of said hinge so that said end plate is rotatable around said second bolt relative to said hinge.

6. The adapter recited in claim 1, further comprising a frame, a chain bar connected to said frame, and a cutting chain extending around said chain bar and communicating with said first attachment means, such that a rotation of the motor shaft is imparted to said chain by said first attachment means to cause said chain to rotate around said chain bar.

7. The adapter recited in claim 6, wherein said first attachment means includes a carrier assembly comprising a hollow gear adapter interfaced with said cutting chain and coupled to said motor shaft and a bolt received through said gear adapter and mated to said shaft, said bolt holding said gear adapter in coaxial alignment with said shaft, such that a rotation of the shaft causes a corresponding rotation of said gear adapter therewith and a rotation of said cutting chain around said chain bar.

8. The adapter recited in claim 7, wherein said carrier assembly further comprises a drive chain gear surrounding said gear adapter and being rotatable therewith, said drive chain gear coupled to said cutting chain, such that a rotation of said gear by said gear adapter causes a corresponding rotation of said cutting chain around said chain bar.

9. The adapter recited in claim 7, further comprising a housing and an opening through said housing in which said carrier assembly is located, said housing being spaced above said frame to which said chain bar is connected, said chain bar being slidable through the space between said frame and said housing and relative to said carrier assembly with which said cutting chain is interfaced so as to adjust the tension of said cutting chain around said chain bar.

10. The adapter recited in claim 9, further comprising means to displace said housing in which said carrier assembly is located relative to said frame to which said chain bar is connected to further adjust the tension of said cutting chain around said chain bar.

11. The adapter recited in claim 10, wherein said means to displace said housing includes a lever arm pivotally connected to said frame and located in close proximity to said housing, a rotation of said lever arm relative to said frame causing said lever arm to move into engagement with and displace said housing.

12. An adapter to be attached to a circular saw after the circular blade has been removed therefrom to convert said saw to a chain saw, said saw being of the type having a motor, a shaft rotated by said motor, and a pair of slide bars spaced radially outward from said shaft, said adapter comprising:
   first attachment means by which to couple said adapter to the motor shaft of the saw;
   second attachment means by which to connect said adapter to the slide bars of the saw;
   a chain bar; and
   a cutting chain extending around said chain bar and interfaced with said first attachment means, such that a rotation of said shaft is imparted to said cutting chain by said first attachment means to cause said chain to rotate around said chain bar.

13. The adapter recited in claim 12, further comprising means by which to vary the distance between said first and second attachment means to correspond with the radial distance of said saw between the motor shaft and slide bars thereof to facilitate the attachment of said adapter to said saw.

14. The adapter recited in claim 13, wherein said means to vary the distance between said first and second attachment means includes hinge means pivotally connected between said first and second attachment means.

15. The adapter recited in claim 14, wherein said first attachment means includes a housing to be coupled to the motor shaft of the saw and said second attachment means includes an end plate to be attached to the slide bars of the saw, said hinge means being pivotally interconnected between said housing and said end plate.

16. The adapter recited in claim 15, wherein said hinge means has first and second ends, said first end pivotally attached to said housing and said second end pivotally attached to said end plate, said hinge means and said end plate being pivotal independently of one another.

17. The adapter recited in claim 16, further comprising a first bolt to pivotally interconnect said first end of said hinge means to said housing so that said hinge means is rotatable around said first bolt relative to said housing, and a second bolt to pivotally interconnect said end plate to said second end of said hinge means so that said end plate is rotatable around said second bolt relative to said hinge means.

18. The adapter recited in claim 15, wherein said housing and said end plate are spaced one above the other, the chain bar being slidable relative to the motor shaft through the space between said housing and said end plate to adjust the tension of the cutting chain around said chain bar.

19. The adapter recited in claim 12, further comprising a carrier assembly by which to couple said first attachment means to the motor shaft of the saw, said carrier assembly including a gear adapter surrounding said motor shaft and rotatable therewith and a drive chain gear surrounding said gear adapter and coupled to said cutting chain, a rotation of said gear adapter by said motor shaft causing a rotation of said drive chain gear and a corresponding rotation of the cutting chain around the chain bar.

20. An adapter to be attached to a circular saw after the circular blade has been removed therefrom to convert said saw to a chain saw, said saw being of the type having a motor, a shaft rotated by the motor, and a pair of slide bars spaced from said shaft, said adapter comprising:
   a housing coupled to the motor shaft of the saw and interconnected with a chain bar around which a cutting chain extends, such that a rotation of the motor shaft is imparted to the cutting chain to cause the cutting chain to rotate around the chain bar; and
   an end plate hingedly interconnected with said housing and removably attached to the slide bars of the saw, said end plate being pivotal relative to said housing to adjust the size of said adapter to correspond with the distance between the motor shaft and slide bars of said saw.

* * * * *